United States Patent [19]

Numaho et al.

[11] Patent Number: 4,663,630

[45] Date of Patent: May 5, 1987

[54] PPI RADAR APPARATUS

[75] Inventors: Yoshio Numaho; Yoshio Kato; Tetsuro Ogawa, all of Tokyo; Hiroshi Okada, Chiba; Kiyoshi Arima, Tochigi, all of Japan

[73] Assignee: Tokyo Keiki Company, Ltd., Tokyo, Japan

[21] Appl. No.: 550,218

[22] Filed: Nov. 9, 1983

[30] Foreign Application Priority Data

Nov. 13, 1982 [JP] Japan ................................ 57-199562
Dec. 23, 1982 [JP] Japan ................................ 57-231565

[51] Int. Cl.⁴ .............................................. G01S 7/12
[52] U.S. Cl. ...................................... 342/176; 342/195
[58] Field of Search ............... 343/5 SC, 5 DP, 5 W, 343/17, 5 R, 5 CD, 5 EM; 315/367, 378, 383; 364/521; 340/720; 367/113

[56] References Cited

U.S. PATENT DOCUMENTS 4,069,481  1/1978  Easy et al. .................... 343/5 SC
4,206,461  6/1980  Pease et al. ..................... 343/5 R Primary Examiner—Thomas H. Tarcza
Assistant Examiner—Bernarr Earl Gregory
Attorney, Agent, or Firm—Wenderoth, Lind & Ponack

[57] ABSTRACT

A PPI radar apparatus is constructed such that even when a transmission time cycle of radio waves is varied by switchover of a distance range to any of short, middle and long distance ranges, a sweep display time cycle of a radar video signal received in any of the distance ranges is maintained constant at all times; the sweep display time cycle is determined to meet the middle distance ranges, in the short distance ranges in which the reception time of radio waves is short, the video signals are written in storage means in real-time and then displayed by readout of the video signals at a low speed in synchronism with the sweep time cycle, in the long distance ranges in which the reception time of radio waves is long, the video signals are written in storage means in real-time and then displayed by a number of readouts in one sweep display time cycle; and the video signals written in a plurality of storage means are parallelly read out and a mean value or peak of the read-out video signals is obtained by arithmetic operation to thereby enhance the signal-to-noise ratio of the radar image.

9 Claims, 12 Drawing Figures

PPI RADAR APPARATUS

BACKGROUND OF THE INVENTION

1. Field of the Invention

The present invention relates to a PPI radar apparatus for use in shipping, aircraft, etc. and, more particularly, to a PPI radar appartus adapted to display an image of a target by the switchover of distance ranges.

2. Description of the Prior Art

In the conventional display of a received video signal in a radar apparatus in accordance with a polar coordinate sweep system (hereinafter referred to as a "PPI" system), transmission of a pulse by a radar antenna and the start of a sweep signal are carried out at the same time and a video signal, received with a delay corresponding to the radiowave propagation distance is, fed to a CRT display under real-time operation to thereby display a target image.

For this reason, with respect to the switchover of the distance ranges in the display on a CRT screen, it is necessary to sweep time and sweep repetition frequency in accordance with the length of the distance.

When the sweep time is varied by the switchover of the distance range, however, the display luminance brightness of the CRT screen varies. More particularly in the short-distance range in which the sweep time is shortened, the display screen becomes dark. On the other hand, the distance range is generally divided into nine or ten ranges to be swtiched over. These ranges each require separate circuits for generating different-time sweep waveforms and, therefore, there gives rise to complexity of a circuit system and an increase in cost. Since the power density for the deflection drive of the CRT in a short-time sweep within a short distance range is increased, the service life of the CRT display is shortened. Further, since the short-time sweep waveform is inferior in linearity, an expensive circuit is required in order to secure linearity.

SUMMARY OF THE INVENTION

One object of the present invention is to provide a PPI radar apparatus capable of uniformly maintaining the brightness of a display screen irrespective of switchover of the distance range.

Another object of the present invention is to provide a PPI radar apparatus making it possible to invariably maintain the luminance brightness of a display screen irrespective of which of the short distance ranges, middle distance ranges and long distance ranges has been selected.

Still another object of the present invention is to provide a PPI radar apparatus capable of obtaining an image of luminance brightness which is high enough for a number of crewmen to simultaneously watch a radar image in any of the distance ranges without using any hood etc. for interrupting an external light to which the display screen is to be exposed.

Yet another object of the present invention is to provide a PPI radar apparatus capable of maintaining the sweep time constant at all times irrespective of the switchover of the distance ranges without installing sweep signal generating circuits of different sweep periods of time in different-distance ranges, thereby realizing a simplification of a circuit system and a decrease in cost.

A further object of the present invention is to provide a PPI radar apparatus capable of increasing the number of scanning lines in the display screen when the distance range has been switched over to a long distance range, thereby enhancing the degree of display of a radar image.

A still further object of the present invention is to provide a PPI radar apparatus capable of improving a signal-to-noise ratio (S/N) by a parallel arithmetic operation of a plurality of received video signals irrespective of which of the short distance ranges, middle distance ranges and long distance ranges has been selected.

A yet further object of this invention is to provide a PPI radar apparatus capable of increasing the number of received video signals to be subjected to a parallel arithmetic operation by a switching operation under stress of weather to thereby obtain a radar image having a high S/N.

A much further object of the present invention is to provide a PPI radar apparatus capable of obtaining a radar image having a high S/N by subjecting a plurality of received video signals to an arithmetic operation in mean value or peak value and to sweep the display.

The aforementioned objects and other objects, features and advantages of the present invention will become apparent from the following description taken in connection with the accompanying drawings.

DESCRIPTION OF THE PREFERRED EMBODIMENTS

Figure 1:
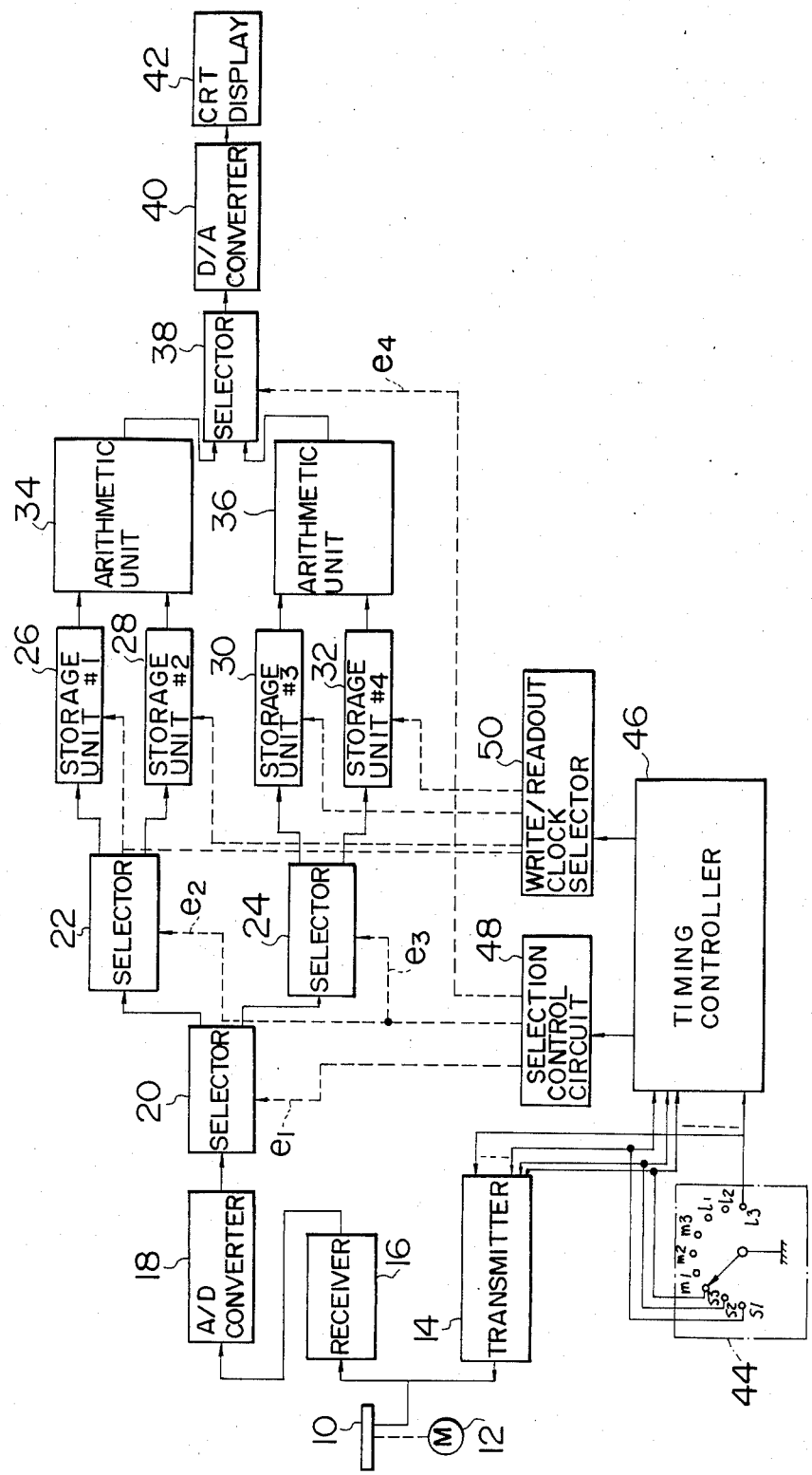
FIG. 1 is a block diagram showing one embodiment of the PPI radar apparatus according to the present invention.

FIG. 1 is a block diagram showing one embodiment of the PPI radar apparatus according to the present invention. The construction of this embodiment will be described at first. A radar antenna 10 is rotated at a constant speed by a motor 12. Transmission pulse signals are supplied to the radar antenna 10 at a prescribed repetition time cycle by a transmitter 14. On the basis of the supply of the transmission pulse signals, radio pulse waves are repeatedly transmitted to the radar antenna 10 in the direction corresponding to the directivity of the radar antenna. The transmitter 14 is adapted to output a transmission pulse signal of a time cycle corresponding to the transmission frequency ft which is determined to be 4 KHz in the short distance range, 2 KHz in the middle distance range and 0.5 KHz in the long distance range by a distance range setting unit 44 adapted to select the distance range as will be clearly described later.

Denoted by 16 is a receiver which is adapted to receive and amplify reflected radio waves received with a delay time corresponding to the distance selected by the reflection of the radio pulse waves from the radar antenna 10 and to output the amplified radio waves as a received video signal. Reference numeral 18 represents an A/D converter which is adapted to convert the received video signal from the receiver 16 into a digital signal such as a 4-bit digital signal, for example. Each of selectors 20, 22 and 24 selects any one of storage units 26, 28, 30 and 32 for writing the digital video signal issued from the A/D converter 18. The storage units also effect readout of a signal. As for the storage units usable for the purpose of the present invention, there are included shift registers or random-access memories (RAM). When there are 480 video data elements to be used in a single sweep display, for example, each of the storage units 26, 28, 30 and 32 comes to have 480 storage areas of a 4-bit construction. Arithmetic units 34 and 36 each function to compute the mean value or detect the peak of the two time-cycles of digital video signals which are parallelly read out of the storage units 26, 28 or 30, 32 when the short distance range has been selected and, when the middle distance range or the long distance range has been selected, serve merely as gates for allowing the read-out digital video signals to be passed therethrough. Reference numeral 38 stands for a selector for selecting outputs read out of the storage units 26, 28, 30 and 32 and outputted from the arithmetic unit 34 or 36; numeral 40 stands for a D/A converter for converting the digital video signals read out of the selector 38 into analog signals, and numeral 42 stands for a CRT display for displaying on a CRT screen the received video signals which were converted into analog signals by the D/A converter 40 by the utilization of a PPI sweep. In the CRT display 42 in this embodiment, the sweep display time cycle Ts and the sweep frequency fs are set at their respective constant values irrespective of the length of the distance range. To be specific, the sweep frequency fs is constantly set at 2 KHz.

The aforementioned distance range setting unit 44 in this embodiment is provided with nine switchover ranges, i.e. $s_1$, $s_2$ and $s_3$ for the short distance ranges, $m_1$, $m_2$ and $m_3$ for the middle distance ranges, and $l_1$, $l_2$ and $l_3$ for the long distance ranges. Reference numeral 46 depicts a timing controller which produces timing signals for selection and control of the selectors 20, 22, 24 and 38 in accordance with the set range signal from the distance range setting unit 44 and timing signals for write and readout relative to the storage units 26, 28, 30 and 32. A selection control circuit 48 is adapted to effect selection and control of the selectors 20, 22, 24 and 38 in accordance with the timing signal from the timing controller 46. A write/readout clock selector 50 is adapted to supply write/readout control and write/readout clock to the storage units 26, 28, 30 and 32 in accordance with the timing signal based on the set distance range and issued from the timing controller 46.

In the distance range setting unit 44 in this embodiment, the radio wave propagation time, the transmission/reception repetition frequency, and the sweep time and sweep frequency in the sweep display are determined in relation to the distance ranges as shown in Table 1 below.

TABLE 1

| Distance Range (Nautical Mile) | Radio Wave Propagation Time (μs) | Transmission Frequency ft (KHz) | Sweep Time (μs) | Sweep Frequency fs (KHz) |
| --- | --- | --- | --- | --- |
| ¼ | 3.09 | | | |
| ¾ | 9.27 | 4 | 148.34 | 2 |
| 1.5 | 18.54 | | | |
| (Small Distance) | | | | |
| 3 | 37.09 | | | |
| 6 | 74.17 | 2 | 148.34 | 2 |
| 12 | 148.34 | | | |
| (Middle Distance) | | | | |
| 24 | 296.69 | | | |
| 48 | 593.37 | 0.5 | 148.34 | 2 |
| 120 | 1483.44 | | | |
| (Long Distance) | | | | |

As is clear from the Table 1 above, the distance ranges of ¼, ¾ and 1.5 nautical miles are set as the small distance ranges, those of 3, 6 and 12 nautical miles as the middle distance ranges, and those of 24, 48 and 120 nautical miles as the long distance ranges respectively. The radio wave propagation time in each of the distance ranges is longer and longer in proportion to the increase of the distance. The transmission/reception frequency ft in the short distance ranges is set as 4 KHz, that in the middle distance ranges as 2 KHz, and that in the long distance ranges as 0.5 KHz respectively. On the other hand, the sweep time and the sweep frequency fs are constantly set as 148.34 μs and 2 KHz respectively in all the distance ranges.

The first embodiment of the PPI radar apparatus according to the present invention is constructed as described above. The function of the first embodiment will be described hereinafter.

Figure 2:
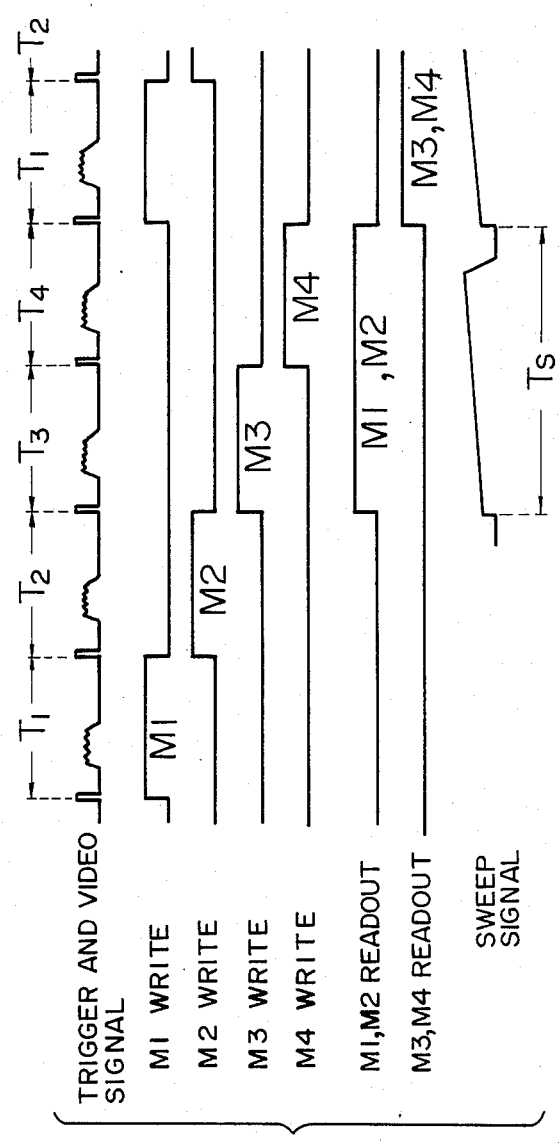
FIG. 2 is a time chart showing control in a short distance range in the embodiment of FIG. 1.

When any one of the selected short distance ranges $s_1$, $s_2$ and $s_3$ has been set in the distance range setting unit 44, control is made on the basis of the time chart shown in FIG. 2. To be more specific, when a short distance range $s_1$, $s_2$ or $s_3$ is selected, the transmission frequency ft of the pulse signal transmitted from the transmitter 14 becomes 4 KHz and the sweep frequency fs of the CRT display is constantly maintained at 2 KHz as will be clearly understood from Table 1 and, therefore, the reception time cycle Tt of the video signal obtained in the receiver 16 becomes one half the sweep display time cycle Ts in the CRT display 42. In this case, the timing controller 46 comes to select, as storage units to be used in the selected short distance range, four storage units 26, 28, 30 and 32 equal to an integer N multiplied by 2. The integer N is determined by the equation: $(Ts)/(Tt) = (ft)/(fs) = 4\ \text{KHz}/2\ \text{KHz} = 2$.

Assuming that the radio pulse waves in the form of transmission pulse waves based on the initial trigger signal shown in FIG. 2 and issued from the transmitter 14 are transmitted from the radar antenna 10 in the state as described above, the selection control circuit 48 outputs a selection signal $e_1$ based on the output from the timing controller 46 into the selector 20, and the output from the A/D converter 18 is inputted to the selector 22. At this time, a selection signal $e_2$ is simultaneously supplied from the selection control circuit 48 to the selector 22 and the selector 22 is selectively connected to the storage unit 26. In this case, therefore, the video signal received in the receiver 16 by the initially transmitted radio pulse waves is digitally converted by the A/D converter 18 and thereafter supplied as video data M1 to the storage unit 26 through the selectors 20 and 22. At this time, a writing clock is supplied in synchronism with the trigger signal to the storage unit 26 by the write/readout clock selector 50, and the digital video signal M1 obtained at the reception time cycle shown by $T_1$ in FIG. 2 is written in the storage unit 2 in real-time.

When a second trigger is generated, the selector 22 is selectively connected to the storage unit 28 by the selection signal $e_2$ issued from the selection control circuit 48, and a digital video signal M2 from the A/D converter 18 is supplied to the storage unit 28 via the selectors 20 and 22. The digital video signal M2 obtained at the reception time cycle shown by $T_2$ in FIG. 2 on the basis of a writing clock supplied from the write/readout clock selector 50 is written in the storage unit 28 in real-time.

Further, when a third trigger is generated, the selection control circuit 48 causes the selector 20 to be selectively connected to the selector 24 and a selection signal $e_3$ causes the output from the selector 24 to be supplied to the storage unit 30. Therefore, a digital video signal M3 obtained at the reception time cycle shown by $T_3$ in FIG. 2 and issued from the A/D converter 18 is supplied to the storage unit 30 via the selectors 20 and 24 and is written in the storage unit 30 in accordance with the read-out clock of the write/readout clock selector 50. The selection control circuit 48 controls write relative to the storage unit 30 as described above and, at the same time, it outputs a selection signal $e_4$ to cause the selector 38 disposed on the output side of the storage units to be selectively connected to the arithmetic unit 34, and simultaneously, the write/readout clock selector 50 supplies readout clocks to the storage units 26 and 28 in which the digital video signals M1 and M2 have been written at the time cycles $T_1$ and $T_2$ respectively and causes the digital video signals M1 and M2 written at the time cycles $T_1$ and $T_2$ in the storage units 26 and 28 to be parallelly read out of the storage units 26 and 28 and to be then supplied to the arithmetic unit 34. In this arithmetic unit 34, either computation of the mean value of the digital video signals M1 and M2 in the time cycles which have been parallelly read out of the storage units 26 and 28 or selection of one of the digital video signals to become the peak is effected. Either the mean value or the peak thus obtained is supplied to the D/A converter 40 through the selector 38 and converted into an analog video signal in the D/A converter 40 and thereafter the target signal which has been obtained in the time cycles $T_1$ and $T_2$ is displayed in the form of an image in the CRT display 42 by a sweep signal which satisfies the sweep frequency $fs = 2$ KHz. The control in readout of the digital video signals from the storage units 26 and 28 is continuously effected during the time the reception video signal in a time cycle $T_4$ resulting from a fourth trigger is written in the storage unit 32, as is clear from the time chart shown in FIG. 2. Therefore, the digital video signals M1 and M2 which have been written in the storage units 26 and 28 are to be read out throughout the time twice the writing time cycle $T_1$ or $T_2$, which time corresponds to the constant sweep display time cycle Ts.

Upon completion of write of the digital video signal M4 in the storage unit 32 throughout the time cycle $T_4$, a subsequent trigger is generated. As a result, the control in write of the digital video signal relative to the storage unit 26 is again carried out. Simultaneously with the writing control, the digital video signals M3 and M4 written in the time cycles $T_3$ and $T_4$ are read out of the storage units 30 and 32 in the same manner as described above. The write and readout are thus effected repeatedly.

As described above, the control in the short distance range is made by writing the video signals in real-time, parallelly reading out the written video signals corresponding to those in the two time-cycles which are equal to the sweep display time cycle Ts, and displaying the read-out signals in the sweep display time cycle which is twice as long as the reception time cycle. Therefore, even when the reception cycle of the video signals is made shorter by the switchover of the distance range into a short distance range, since the sweep display time cycle is invariably determined, the luminance brightness in the display on the CRT screen is not degraded at all even by the aforementioned switchover into a small distance range. Furthermore, since the digital video signals read-out parallelly are averaged, when one of the written data contains therein noise components, for example, the noise level can be reduced to one half by the averaging treatment to thereby enable the signal-to-noise ratio (S/N) to be increased. On the other hand, when the peak is selected, since a signal of the parallelly read-out digital video signals having a higher level is selected, a target, even though it exhibits weak reflection waves, can clearly be displayed on the displaying screen.

The function of the embodiment assumed when the middle distance range $m_1$, $m_2$ or $m_3$ has been selected in the distance range setting unit 44 will be described with reference to the time chart shown in FIG. 3.

When a middle distance range is selected in the distance range setting unit 44, the timing controller 46 selects two of the storage units 26, 28, 30 and 32, such as the storage units 26 and 30 for example, as storage units for use in write and readout in the middle distance range. The remaining storage units 28 and 32, in this case, are put to non-use. As shown in Table 1 mentioned above, selection of a middle distance range switches over the transmission frequency ft of the transmitter 14 to be equal to the sweep frequency fs of the CRT display 32, i.e. to fulfill the equation of ft=fs=2 KHz.

Figure 3:
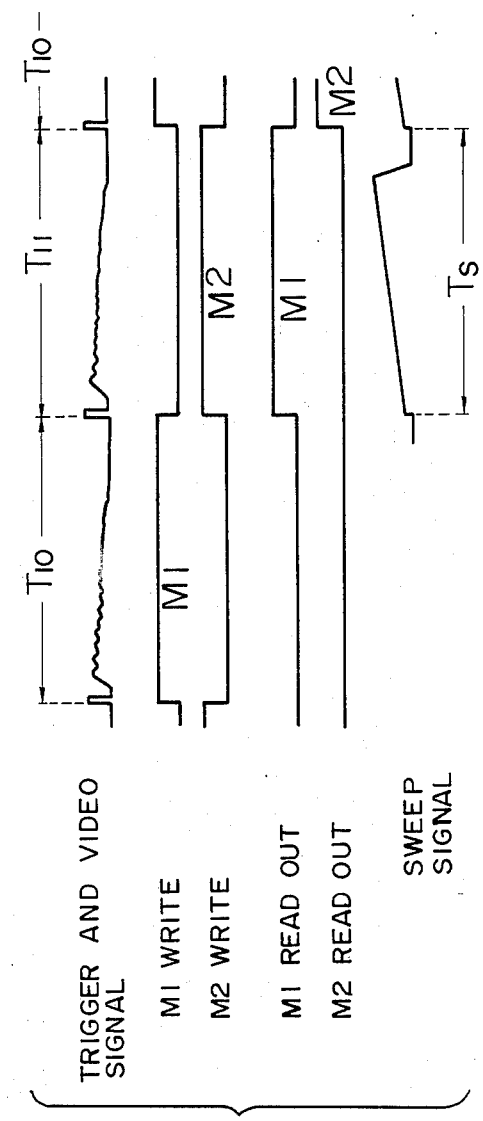
FIG. 3 is a time chart showing control in a middle distance range in the embodiment of FIG. 1.

When an initial trigger is generated as shown in FIG. 3, in this state, the selection control circuit 48 selectively allows the selectors 22 and 24 to be stationarily connected respectively to the storage units 26 and 30 by means of the timing controller 46 and the selector 20 is selectively connected to the storage unit 26 by a selection signal $e_1$ supplied to the selector 20 in synchronism with the initial trigger. Therefore, a digital video signal M1 of a time cycle $T_{10}$ outputted from the A/D converter 18 is supplied to the storage unit 26 via the selectors 20 and 22 and written in the storage unit 26 in accordance with a writing clock from the write/readout clock selector 50. When a second trigger is generated thereafter, the selector 20 is selectively connected to the storage unit 30 and a digital video signal M2 from the A/D converter 18 is written in the storage unit 30. Simultaneously with the write in the storage unit 30, a readout clock is supplied from the write/readout clock selector 50 to the storage unit 26. In the middle distance range, since the arithmetic unit 34 serves merely as a gate circuit and since the selector 38 is selectively connected to the arithmetic unit 34 side by a selection signal $e_4$, the digital video signal M1 which has been read out of the storage unit 26 one time cycle before the time cycle in which the digital video signal M2 is read out is supplied to the D/A converter 40 and converted therein into an analog signal. The analog signal is displayed by sweeping in the CRT display 42.

When a third trigger is generated, a digital video signal is again written in the storage unit 26 and, at the same time, the digital video signal M2 which has been written in the storage unit 30 one time cycle before the time cycle $T_{11}$ is read out. The digital video signal M2 is then converted into an analog signal in the A/D converter 40. The converted signal is displayed by sweeping in the CRT display 42.

In the middle distance range, as described above, the two selected storage units undergo alternate write and readout of the received video signals.

The function of the embodiment assumed when a long distance range has been selected will be described with reference to the time chart shown in FIG. 4.

Assuming that any one of the long distance ranges $l_1$, $l_2$ and $l_3$ is selected in the distance range setting unit 44, this selection switches over the transmission frequency ft into one fourth the sweep frequency fs, i.e. to satisfy the equation of ft=0.5 KHz, as shown in Table 1. In this case, the timing controller 46 selects two of the storage units 26, 28, 30 and 32, such as the storage units 26 and 30 for example, as storage units for use in storage control in the long distance range similarly to in the aforementioned middle distance range. The remaining storage units 28 and 32 are similarly put to non-use. Since the storage units 26 and 30 are used for the storage control in the long distance range, as described above, the selectors 22 and 24 are selectively connected stationarily to the storage units 26 and 30 respectively, and the selector 38 is brought to a state as selectively connected to either the arithmetic circuit 34 or 36 by means of a selection signal $e_4$.

When an initial trigger is generated in the state mentioned above, as shown by the time chart in FIG. 4, the selector 20 is selectively connected to the storage unit 26 by a selection signal $e_1$ from the selection control circuit 48, and the digital video signal M1 outputted on the basis of the initial trigger from the A/D converter 18 is written in the storage unit 26 in real-time on the basis of a writing clock from the write/readout clock selector 50.

When a second trigger is subsequently generated, the selector 20 is selectively connected to the storage unit 30, and the digital video signal M2 from the A/D converter 18 is written in real-time in the storage unit 30 on the basis of a writing clock. Simultaneously with the start of the write of the video signal M2 in the storage unit 30, a readout clock is supplied from the write/readout clock selector 50 to the storage unit 26 having the digital video signal written therein during the time cycle $T_{30}$ which is one time cycle before the present time cycle $T_{31}$ to thereby read out the digital video signal M1 written in the time cycle $T_{30}$.

Figure 4:
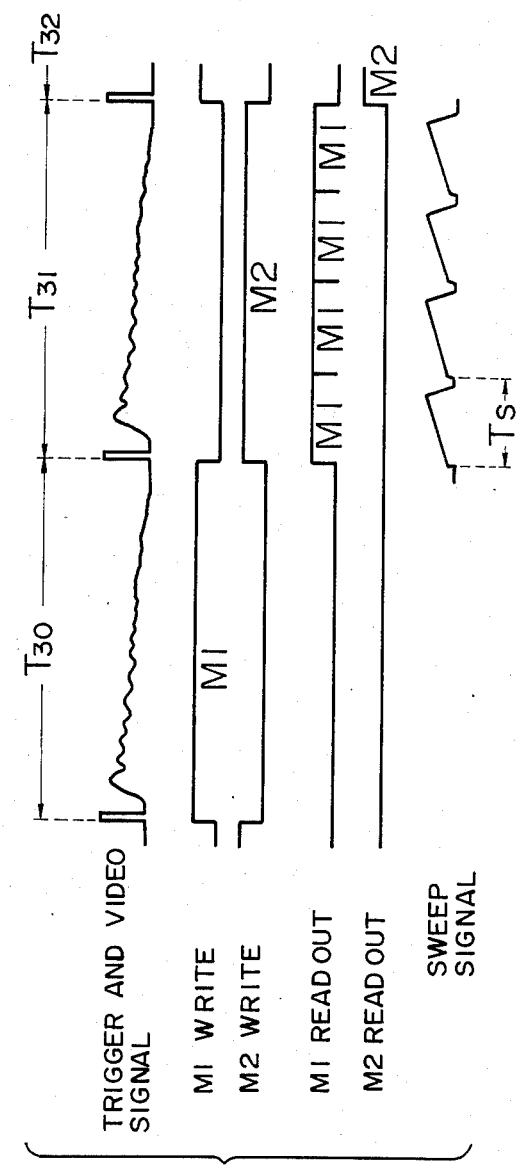
FIG. 4 is a time chart showing control in a long distance range in the embodiment of FIG. 1.

In this case, since the sweep display time cycle Ts of the CRT display 42 is one fourth the time cycle $T_{31}$ in which the digital video signal is written in the storage unit 30, the control in readout from the storage unit 26 is effected as shown by the time chart in FIG. 4. Specifically, the readout from the storage unit 26 is repeated four times during the time cycle $T_{31}$ in which the write relative to the storage unit 30 is carried out.

That is to say, since an integer M which is obtained by equation of $(Tt)/(Ts)=(fs)/(ft)=2$ KHz/0.5 KHz=4 is set in the long distance range, the readout of the digital video signal from the storage unit having the digital video signal stored therein in the time cycle immediately before the present time cycle is to be repeated M=4 times in the present time cycle.

Assuming that a third trigger is generated, control in write relative to the storage unit 26 is again carried out and, at the same time, readout from the storage unit 30 having the digital video signal M2 written therein in the time cycle $T_{31}$ which is one time cycle before the present time cycle is carried out. This readout from the storage unit 30 is similarly repeated M=4 times during the time cycle $T_{32}$ in which the storage unit 26 has the digitial video signal written therein.

Figure 5:
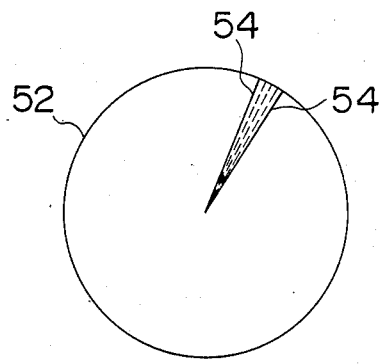
FIG. 5 is an explanatory view showing increase of the scanning lines in the long distance range.

Since the readout from each of the storage units in the long distance range is repeated M=4 times, as described above, sweep display of one same video signal in the CRT display 42 is repeated four times during one time cycle for the write of the video signal in each of the storage units. For this reason, three additional sweep display lines shown by broken lines in FIG. 5, in readout display in the long distance range according to the present invention, appear between the scanning lines 54 shown by solid lines in the CRT screen 52 in synchronism with the write to thereby increase the density of the scanning lines four times. Accordingly, the resolution of the image and the degree of display of the target to be displayed in the CRT screen are enhanced to a great extent.

In the first embodiment described so far, the sweep frequency fs is set constant at 2 KHz irrespective of the lengths of the distance ranges. However, the present invention should not be limited to this embodiment, but may adopt an optional sweep frequency. Further, in the first embodiment, the number 2N of the storage units to be used in the short distance range is determined by setting N=2 and the readout times M of each storage unit is set as 4. However, N may be an optional integer more than two and M may be an optional integer.

Furthermore, the display control accompanied by switchover of distance ranges according to the present invention may be applied not only to a radar apparatus as in the first embodiment but also to a sonar which allows frequently received signals to be treated by display and to an ultrasonic flaw detector without giving any modification thereto.

Figure 6:
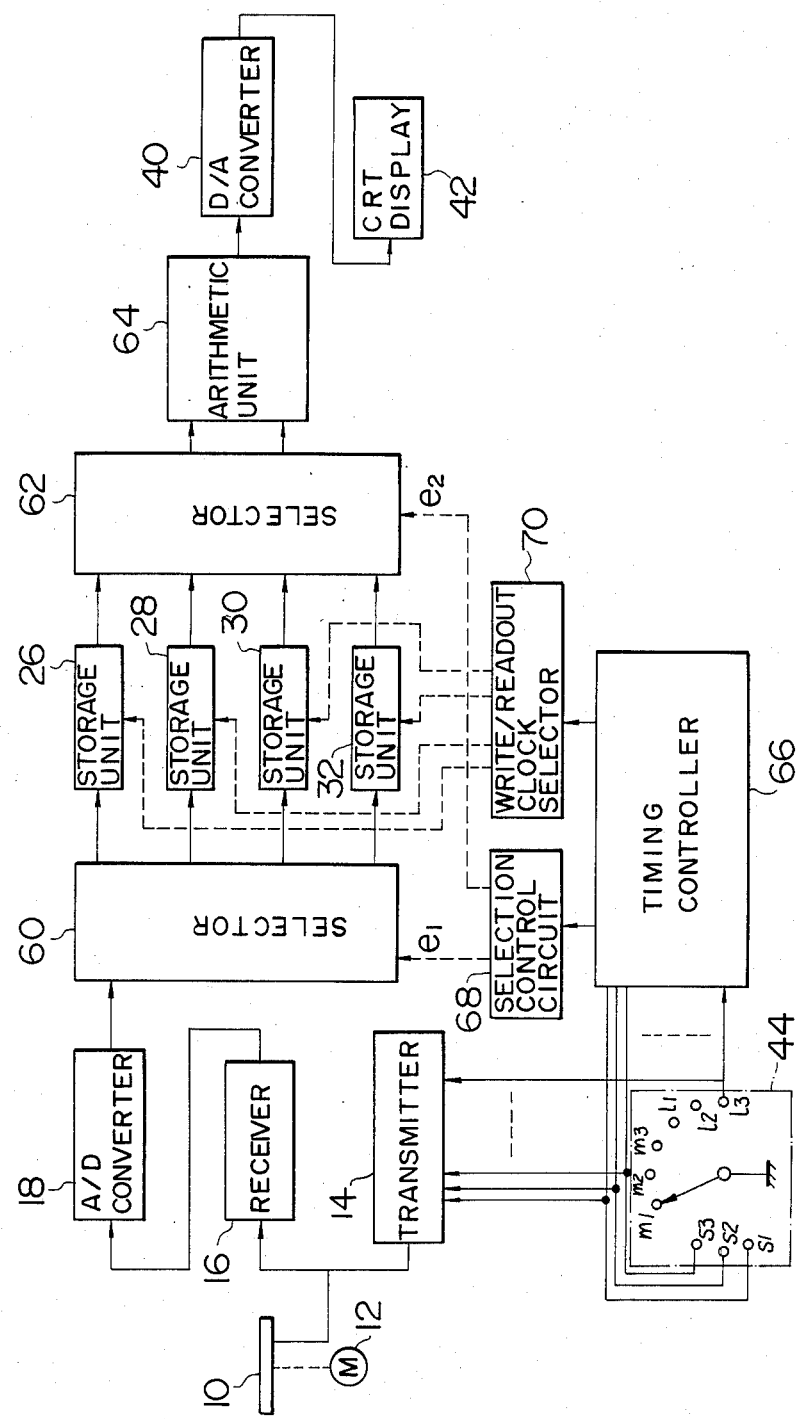
FIG. 6 is a block diagram showing another embodiment of the PPI radar apparatus according to the present invention.

FIG. 6 is a block diagram showing another embodiment of the PPI radar apparatus according to the present invention. The same circuits as those in the first embodiment are indicated by the same reference numerals as used in FIG. 1. The difference between the first and second embodiments is that the mean value or peak of the data is obtained in the short and long distance ranges in the former embodiment, whereas in the latter embodiment it is obtained in all distance ranges, i.e. in the short, middle and long distance ranges. The construction of the second embodiment will now be described. A radar antenna 10 is rotated at a constant speed by a motor 12. Transmission pulse signals are supplied to the radar antenna 10 at a prescribed repetition time cycle by a transmitter 14. On the basis of the supply of the transmission pulse signals, radio pulse waves are repeatedly transmitted to the radar antenna 10 in the direction corresponding to the directivity of the radar antenna. The transmitter 14 is adapted to output a transmission pulse signal of a time cycle corresponding to the transmission frequency ft which is determined to be 4 KHz in the short distance range, 2 KHz in the middle distance range and 0.5 KHz in the long distance range by a distance range setting unit 44 adapted to select the distance range as will be well understood from the description given afterwards.

Denoted by reference numeral 16 is a receiver which is adapted to receive and amplify reflected radio waves received with a delay time corresponding to the distance selected by the reflection of the radio pulse waves from the radar antenna 10 and to output the amplified radio waves as a received video signal. Reference numeral 18 represents an A/D converter which is adapted to convert the received video signal from the receiver 16 into a digital signal such as a 4-bit digital signal, for example.

Numeral 60 stands for a selector which selects a storage unit for writing therein the digital video signal from the A/D converter 18. Each of storage units 26, 28, 30 and 32 is adapted to write therein and read-out therefrom the digital video signal. Shift registers or RAMS may be used as these storage units. When there are 480 video data elements to be used in a single sweep display, for example, each of the storage units 26, 28, 30 and 32 comes to have 480 storage areas of a 4-bit construction.

In the following description, the data stored in the storage units 26, 28, 30 and 32, i.e. digital video signals, are denoted by the same numerals as M1, M2, M3 and M4 of the received video signals allotted in the write order mentioned.

Denoted by numeral 62 is a selector for selecting the readout outputs from the storage units 26, 28, 30 and 32, by 64 is an arithmetic unit adapted to compute and output the mean value or peak of the digital video signals parallelly outputted through the selector 62, by 40 is a D/A converter for converting the digital video signal (mean value or peak) outputted from the arithmetic unit 64, and by 42 is a CRT display for displaying on a CRT secreen the received video signal which has been converted into the analog signal by the D/A converter 40 by utilization of PPI sweep. In the CRT display 42 in this embodiment, the sweep display time cycle Ts and the sweep frequency fs are set at their respective constant values irrespective of the length of the distance range. To be specific, the sweep frequency fs is constaly set at 2 KHz.

A distance range setting unit 44 is provided with nine switchover ranges, i.e. $s_1$, and $s_2$ and $s_3$ for the short distance ranges, $m_1$, $m_2$ and $m_3$ for the middle distance ranges, and $l_1$, $l_2$ and $l_3$ for the long distance ranges. Reference numeral 66 depicts a timing controller which produces timing signals for selection and control of the selectors 60 and 62 in accordance with the set range signal from the distance range setting unit 44 and timing signals for write and readout relative to the storage units 26, 28, 30 and 32. A selection control circuit 68 is adapted to effect selection and control of the selectors 60 and 62 in accordance with the timing signal from the timing controller 66. To be more specific, since the four storage units 26, 28, 30 and 32 are all used when the small distance range is selected, the selection control circuit 68 outputs to the selector 60, every one transmission/receiption time cycle Ts (fs=4 KHz), a selection control signal $e_1$ which allows the outputs from the A/D converter 18 to be connected successively to the storage units 26, 28, 30 and 32 repeatedly and simultaneously issues to the selector 62 a selection control signal $e_2$ which allows two of the storage units to be connected to the arithmetic unit 64 for the purpose of parallel readout of the digital video signals from the two storage units in such a manner that when the storage unit 26 serves to write a digital video signal therein a time cycle, for example, the storage units 30 and 32 which have already written therein the digital video signals in the immediately previous time cycle are to be connected to the selector 64. To summarize, the selection in write in the storage units and the selection in readout from the storage units in the short distance range are as shown in Table 2 below.

TABLE 2

| Selection in Write | Selection in Readout |
| --- | --- |
| Storage Unit 26 | Storage Units 30, 32 |
| Storage Unit 28 | Storage Units 30, 32 |
| Storage Unit 30 | Storage Units 26, 28 |
| Storage Unit 32 | Storage Units 26, 28 |

On the other hand, three of the storage units such as the storage units 26, 28 and 30, for example, are used in the middle or long distance range. In this case, the selection in write in the storage units and the selection in readout from the storage units are effected by the controllers 60 and 62 in accordance with the selection control signals from the selection control circuit 68 as shown in Table 3 below.

TABLE 3

| Selection in Write | Selection in Readout |
| --- | --- |
| Storage Unit 26 | Storage Units 28, 30 |
| Storage Unit 28 | Storage Units 30, 26 |
| Storage Unit 30 | Storage Units 26, 28 |

A write/readout clock selector 70 is adapted to supply write/readout control and write/readout clock to the storage units 26, 28, 30 and 32 in accordance with the timing signal based on the set distance range and issued from the timing controller 66.

In the distance range setting unit 44 in this embodiment, the radio wave propagation time, the transmission/reception repetition frequency, and the sweep time and sweep frequency in the sweep display are identical with those in Table 1 above determined in relation to the distance ranges.

Specifically, the distance ranges of ¼, ¾ and 1.5 nautical miles are set as the small distance ranges, those of 3, 6 and 12 nautical miles as the middle distance ranges, and those of 24, 48 and 120 nautical miles as the long distance ranges respectively. The radio wave propagation time in each of the distance ranges is longer and longer in proportion to the increase of the distance. The transmission/reception frequency ft in the short distance ranges is set as 4 KHz, that in the middle distance ranges as 2 KHz, and that in the long distance ranges as 0.5 KHz respectively. On the other hand, the sweep time and the sweep frequency fs are constantly set as 148.34 μs and 2 KHz respectively in all the distance ranges.

The function of the second embodiment shown in FIG. 6 will be described hereinafter.

Figure 7:
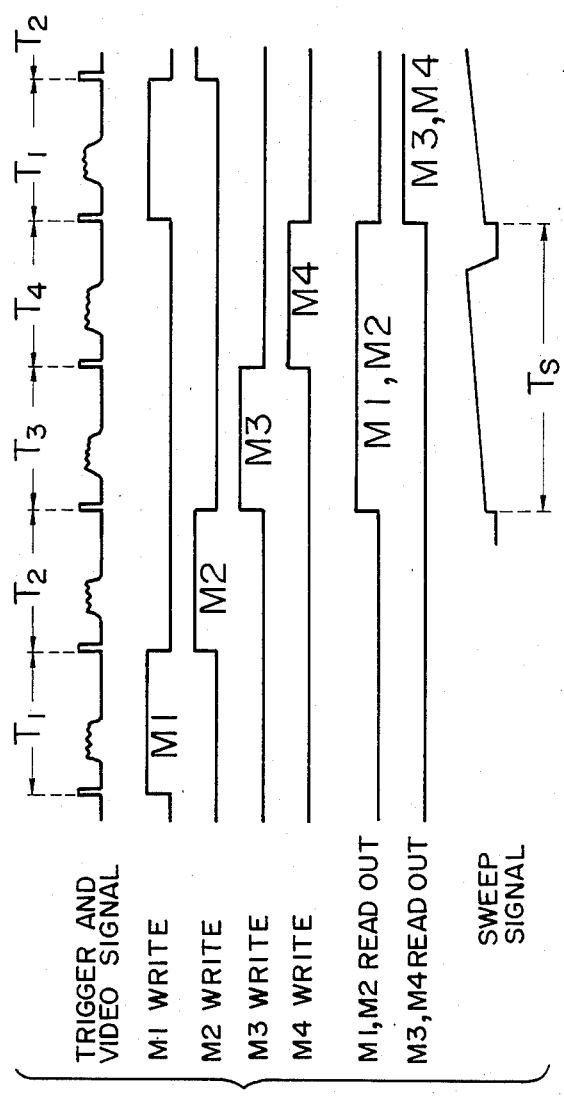
FIG. 7 is a time chart showing control in a short distance range in the embodiment of FIG. 6.

When any one of the selected short distance ranges $s_1$, $s_2$ and $s_3$ has been set in the distance range setting unit 44, control is made on the basis of the time chart shown in FIG. 7. To be more specific, when a short distance range $s_1$, $s_2$ or $s_3$ is selected, the transmission frequency ft of the pulse signal transmitted from the transmitter 14 becomes 4 KHz and the sweep frequency fs of the CRT display is constantly maintained at 2 KHz as will be clearly understood from Table 1 above and, therefore, the reception time cycle Tt of the video signal obtained in the receiver 16 becomes one half the sweep display time cycle Ts in the CRT display 42. In this case, the timing controller 66 comes to select, as storage units to be used in the selected short distance range, four storage units 26, 28, 30 and 32 equal to an integer N multiplied by 2. This integer N is determined by the equation: $(Ts)/(Tt)=(ft)/(fs)=4$ KHz/2 KHz=2.

Assuming that the radio pulse waves in the form of transmissin pulse waves based on the initial trigger shown in FIG. 7 and issued from the transmitter 14 are transmitted from the radar antenna 10 in the state as described above, the selection control circuit 68 outputs a selection signal $e_1$ based on the output from the timing controller 66 into the selector 60, and the output from the A/D converter 18 is inputted to the storage unit 26. Therefore, the video signal received in the receiver 16 by the initially transmitted radio pulse waves is digitally converted by the A/D converter 18 and thereafter supplied as video data M1 to the storage unit 26 through the selector 60. At this time, a writing clock is supplied in synchronism with the trigger to the storage unit 26 by the write/readout clock selector 70, and the digital video signal M1 obtained at the reception time cycle shown by $T_1$ in FIG. 7 is written in the storage unit 26 in real-time.

When a second trigger is generated, the selector 60 is selectively connected to the storage unit 28 by the selection signal $e_1$ issued from the selection control circuit 68, and a digital video signal M2 from the A/D converter 18 is supplied to the storage unit 28 via the selector 60. The digital video signal M2 obtained at the reception time cycle shown by $T_2$ in FIG. 7 on the basis of a writing clock supplied from the write/readout clock selector 70 is written in the storage unit 28 in real-time.

Further, when a third trigger is generated, the selection control circuit 68 causes the selector 60 to be connected to the storage unit 30.

For this reason, a digital video signal M3 obtained at the reception time cycle shown by $T_3$ in FIG. 7 and issued from the A/D converter 18 is supplied to the storage unit 30 via the selector 60 and is written in the storage unit 30 in accordance with the readout clock of the write/readout clock selector 70. On the other hand, the selection control circuit 68 controls write relative to the storage unit 30 as described above and, at the same time, it outputs a selection signal $e_2$ to cause the selector 62 disposed on the output side of the storage units to be selectively connected to the arithmetic unit 64, and simultaneously, the write/readout clock selector 70 supplies readout clocks to the storage units 26 and 28 in which the digital video signals M1 and M2 have been written at the time cycles $T_1$ and $T_2$ respectively and causes the digital video signals M1 and M2 written at the time cycles $T_1$ and $T_2$ in the storage units 26 and 28 to be parallelly read out of the storage units 26 and 28 and to be then supplied to the arithmetic unt 64. In this arithmetic unit 64, either computation of the mean values of the digital video signals M1 and M2 in the time cycles which have been parallelly read out of the storage units 26 and 28 or selection of one of the digital video signals to become the peak is effected. Either the mean value or the peak thus obtained is supplied to the D/A converter 40 through the selector 64 and converted into an analog video signal in the D/A converter 40 and thereafter the target signal which has been obtained in the time cycles $T_1$ and $T_2$ is displayed in the form of an image in the CRT display 42 by a sweep signal which satisfies the sweep frequency fs=2 KHz. The control in readout of the digital video signals from the storage units 26 and 28 is continuously effected during the time the reception video signal in a time cycle $T_4$ resulting from a fourth trigger is written in the storage unit 32, as is clear from the time chart in FIG. 7. Therefore, the digital video signals M1 and M2 which have been written in the storage units 26 and 28 are to be read out throughout the time twice the writing time cycle $T_1$ or $T_2$, which time corresponds to the constant sweep display time cycle Ts.

Upon completion of write of the digital video signal M4 in the storage unit 32 throughout the time cycle $T_4$, a subsequent trigger is generated. As a result, the control in write of the digital video signal relative to the storage unit 26 is again carried out. Simultaneously with the writing control, the digital video signals M3 and M4 written in the time cycles $T_3$ and $T_4$ are read out of the storage units 30 and 32 in the same manner as described above. The write and readout are thus effected repeatedly.

As described above, the control in the short distance range is made by writing the video signals in real-time, parallelly reading out the written video signals corresponding to those in the two time-cycles which are equal to the sweep display time cycle Ts, and displaying the read-out signals in the sweep display time cycle which is twice as long as the reception time cycle. Therefore, even when the reception cycle of the video signals is made shorter by the switchover of the distance range into a short distance range, since the sweep display time cycle is invariably determined, the luminance brightness in the display on the CRT screen is not degraded at all even by the aforementioned switchover into a small distance range. Furthermore, since the digital video signals read-out parallelly are averaged, when one of the written data contains therein noise components, for example, the noise level can be reduced to one half by the averaging treatment to thereby enable the S/N to be increased. On the other hand, when the peak is selected, since a signal of the parallelly read-out signal video signals having a higher level is selected, a target, even though it exhibits weak reflection waves, can clearly be displayed on the displaying screen.

The function of the second embodiment assumed when the middle distance range $m_1$, $m_2$ or $m_3$ has been selected in the distance range setting unit 44 will be described with reference to the time chart shown in FIG. 8.

When a middle distance range is selected in the distance range setting unit 44, the timing controller 66 selects three of the storage units 26, 28, 30 and 32, such as the storage units 26, 28 and 30 for example, as storage units for use in write and readout in the middle distance range. The remaining storage unit 32, in this case, is put to non-use. As shown in Table 1 mentioned previously, selection of a middle distance range switches over the transmission frequency ft of the transmitter 14 to be equal to the sweep frequency fs of the CRT display 32, i.e. to satisfy the equation: ft=fs=2 KHz.

Figure 8:
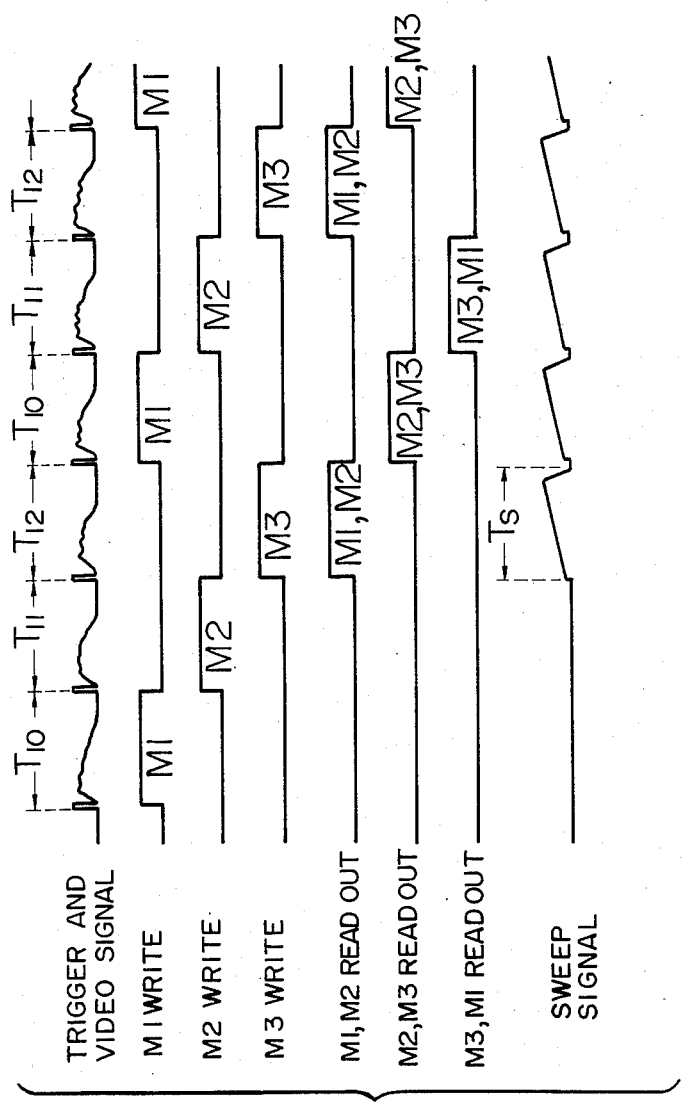
FIG. 8 is a time chart showing control in a middle distance range in the embodiment of FIG. 6.

When an initial trigger is generated as shown in FIG. 8, in this state, the selection control circuit 68 allows the selector 60 be selectively connected to the storage unit 26 by a selection signal $e_1$ supplied to the selector 60 from the selection control circuit 68. Therefore, a digital video signal M1 of a time cycle $T_{10}$ outputted from the A/D converter 18 is supplied to the storage unit 26 in accordance with a writing clock from the write/readout clock selector 70. When a second trigger is then generated, the selector 60 is selectively connected to the storage unit 28 and a digital video signal M2 from the A/D converter 18 is written in the storage unit 28. Further, when a third trigger is generated, the selector 60 is selectively connected to the storage unit 30 and a digital video signal M3 from the A/D converter 18 is written in the storage unit 30. At the time that the write of the digital video signal M3 relative to the storage unit 30 starts, the selector 62 allows the storage units 26 and 28 to be connected to the arithmetic unit 64 by means of a control signal $e_2$ and simultaneously readout clocks are supplied to the storage units 26 and 28 from the write/readout clock selector 70. As a result, the digital video signals M1 and M2 written in the time cycles $T_{10}$ and $T_{11}$ are parallelly read out. The read-out data M1 and M2 are subjected to arithmetic operation in the arithmetic unit 64, and the resultant mean value or peak is outputted to the D/A converter 40 to be converted into an analog signal. The converted analog signal is supplied to the CRT display 42 and displayed thereon by sweeping.

When a fourth trigger is subsequently generated, the write of the digital video signal is switched over to the write relative to the storage unit 26 and, at the same time, the digital video signals M2 and M3 which have been written in the storage units 28 and 30 are parallelly read out. Similarly, in consequence of the generation of a fifth trigger, the write is effected relative to the storage unit 28 and the digital video signals M3 and M1 are parallelly read out. The write and readout are thus repeated.

The function of the second embodiment assumed when a long distance range has been selected will be described with reference to the time chart shown in FIG. 9.

Assuming that any one of the long distance ranges $l_1$, $l_2$ and $l_3$ is selected in the distance range setting unit 44, this selection switches over the transmission frequency ft into one fourth the sweep frequency fs, i.e. to satisfy the equation: ft=0.5 KHz, as shown in Table 1. In this case, the timing controller 66 selects three of the storage units 26, 28, 30 and 32, such as the storage units 26, 28 and 30 for example, as storage units for use in storage control in the long distance range similarly to in the aforementioned middle distance range. The remaining storage unit 32 is similarly put to non-use.

Figure 9:
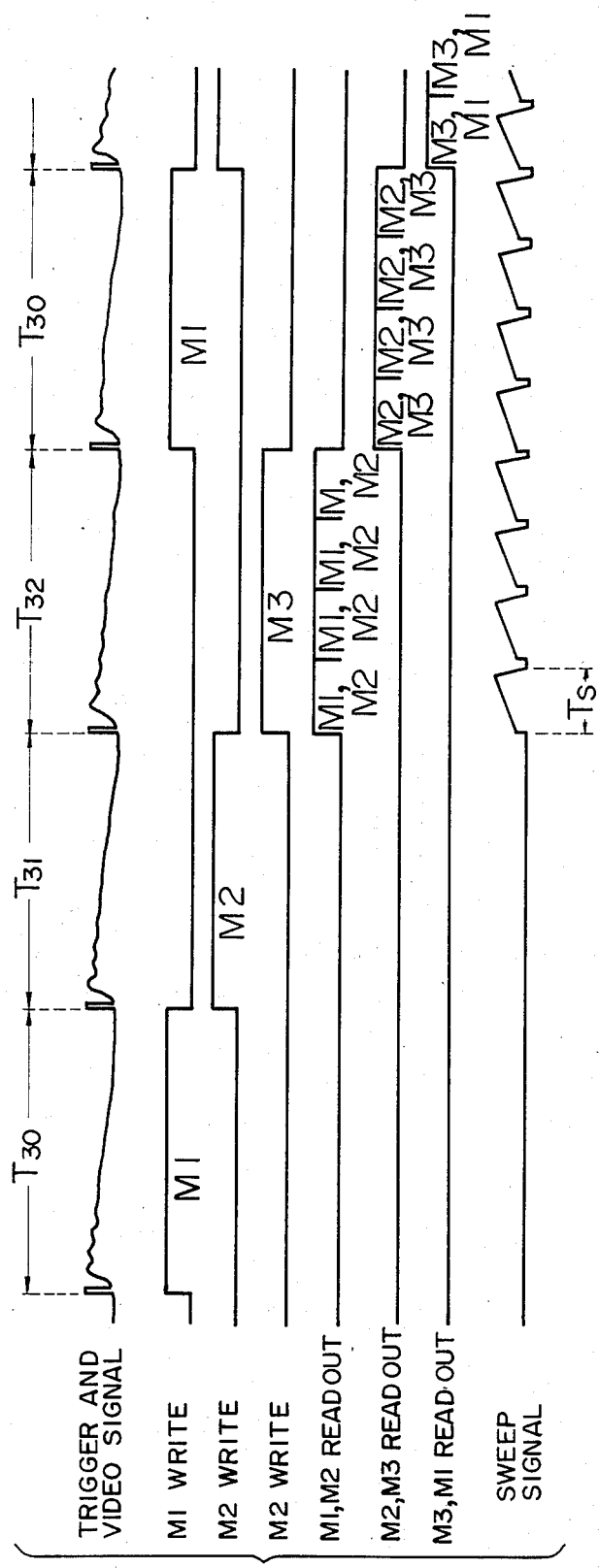
FIG. 9 is a time chart showing control in a long distance range in the embodiment of FIG. 6.

When an initial trigger is generated in the aforementioned state, as shown by the time chart in FIG. 9, the selector 60 is selectively connected to the storage unit 26 by a selection signal $e_1$ from the selection control circuit 68, and the digital video signal M1 outputted on the basis of the initial trigger from the A/D converter 18 is written in the storage unit 26 in real-time on the basis of a writing clock from the wtire/readout clock selector 70.

When a second trigger is subsequently generated, the selector 60 is selectively connected to the storage unit 28, and the digital video signal M2 from the A/D converter 18 is written in real-time in the storage unit 28 on the basis of a writing clock. Further, the generation of a third trigger allows the selector 60 to be selectively connected to the storage unit 30 and a digital video signal M3 from the A/D converter 18 is written in the storage unit 30.

Simultaneously with the start of the write of the video signal M3, the selector 62 allows the storage units 26 and 28 having the digital video signals M1 and M2 written therein in the time cycles $T_{30}$ and $T_{31}$ to be selectively connected to the arithmetic unit 64, and the digital video signals M1 and M2 written in the time cycles $T_{30}$ and $T_{31}$ are read parallelly out of the storage units 26 and 28 by supplying readout clocks to these storage units from the write/readout clock selector 70.

In this case, since the sweep display time cycle Ts of the CRT display 42 is one fourth the time cycle $T_{32}$ in which the digital video signal is written in the storage unit 30, the control in readout from the storage units 26 and 28 is effected as shown by the time chart in FIG. 9. To be more specific, the readout from the storage units 26 and 28 is repeated four times during the time cycle $T_{32}$ in which the write relative to the storage unit 30 is carried out.

That is to say, since an integer M which is obtained by the equation: $(Tt)/(Ts)=(fs)/(ft)=2$ KHz/0.5 KHz=4 is set in the long distance range, the readout of the digital video signals stored therein in the two time-cycles before the present time cycle is to be repeated M=4 times in the present time cycle.

The digital video signals M1 and M2 which have been read out repeatedly four times are subjected to arithmetic operation in the arithmetic unit 64 to obtain a mean value by computation or a peak by selection, and the resultant mean value or peak is supplied to the D/A converter 40 and then displayed by sweeping on the CRT display 42.

In the case of generation of a fourth trigger, the digital video signals M2 and M3 are read parallelly out of the storage units 28 and 30 repeatedly four times in the time cycle for the write of the digital video signal relative to the storage unit 26.

Since the readout from each of the storage units in the long distance range is repeated M=4 times, as described above, sweep display of one same video signal in the CRT display 42 is repeated four times during one time cycle for the write of the video signal in each of the storage units. For this reason, three additional sweep display lines shown by broken lines in FIG. 5, in readout display in the long distance range according to the present invention, appear between the scanning lines 54 shown by solid lines in the CRT screen 52 in synchronism with the write (at 0.5 KHz) as in the first embodiment to thereby increase the density of the scanning lines four times. Accordingly, the resolution of the image and the degree of display of the target to be displayed in the CRT screen are enhanced to a great extent.

Figure 10:
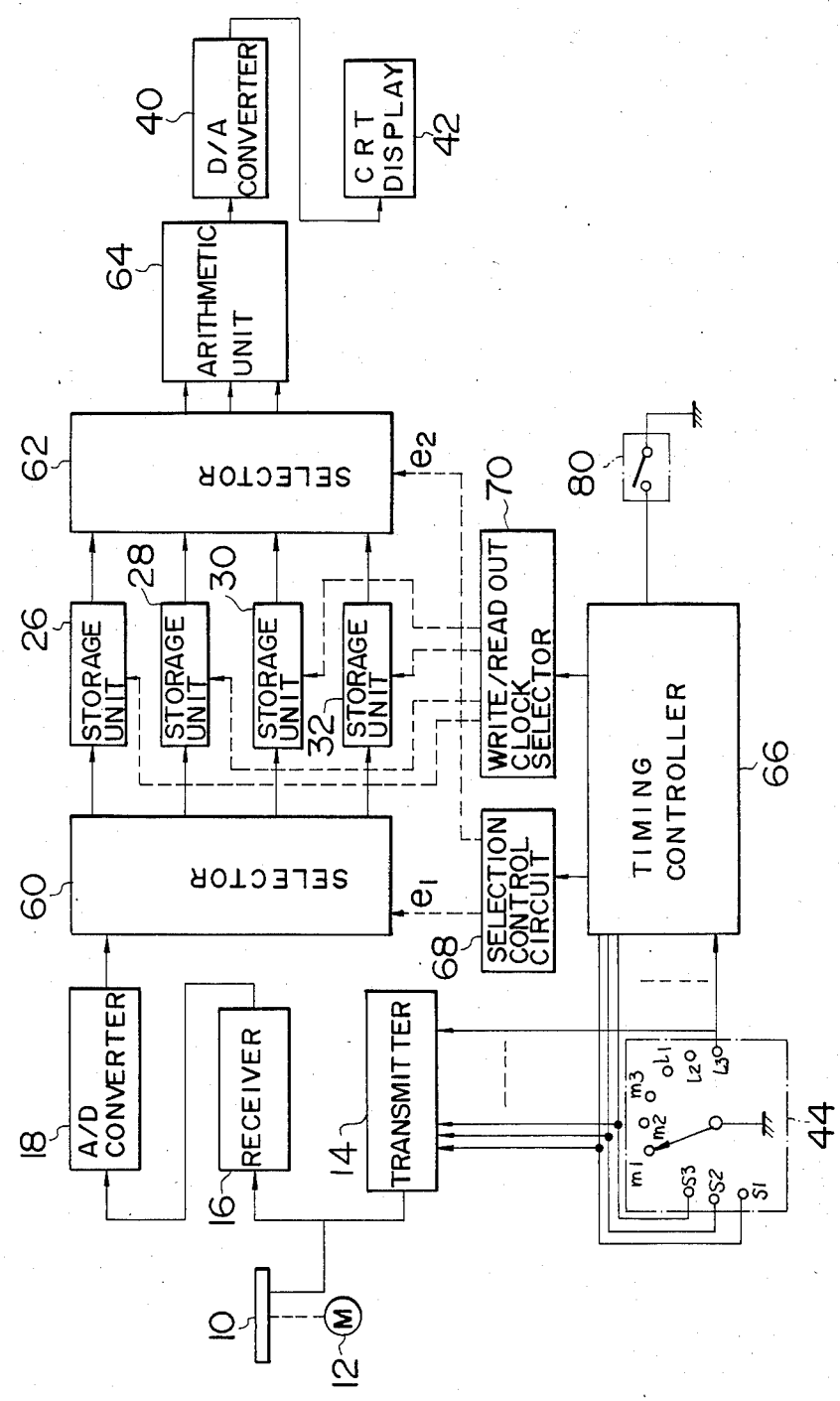
FIG. 10 is a block diagram showing still another embodiment of the PPI radar apparatus according to the present invention.

FIG. 10 is a block diagram showing still another embodiment showing the PPI radar apparatus according to the present invention. This third embodiment is characterized in that the four storage units are used in the middle and long distance ranges as in the short distance range of the first and second embodiments and that the number of the storage units to be used in readout treatment can be varied by switchover treatment.

The radar antenna 10, transmitter 14, receiver 16, A/D converter 18, selectors 60 and 62, storage units 26, 28, 30 and 32, arithmetic unit 64, D/A converter 40, CRT display 42 and distance range setting unit 44 in this embodiment are identical in construction with those of the second embodiment shown in FIG. 6. The controlling functions of the timing controller 66, selection control circuit 68 and write/readout clock selector 70 in the present embodiment are also identical with those of the second embodiment shown in FIG. 6 insofar as the setting of the small distance range is concerned.

In the third embodiment shown in FIG. 10, when a middle or long distance range has been set, the four storage units 26, 28, 30 and 32 serve to write therein and read out therefrom the digital video signals similarly to the case where the small distance range has been set in the first and second embodiments. Further, a weather mode switch 80 is connected to the timing controller 66. When the weather mode switch 80 is turned off, i.e. in a normal mode, the selection control circuit 68 allows the selectors 60 and 62 to be selectively connected to the storage units 26, 28, 30 and 32 to thereby effect selection of the storage units in the middle or long distance range as shown in Table 4 below.

TABLE 4

| Selection in Write | Selection in Readout |
| --- | --- |
| Storage Unit 26 | Storage Units 30, 32 |
| Storage Unit 28 | Storage Units 32, 26 |
| Storage Unit 30 | Storage Units 26, 28 |
| Storage Unit 32 | Storage Units 28, 30 |

When the weather mode switch is turned on, i.e. in a stormy weather mode, the control is switched over to parallel readout of the digital video signals from three of the storage units and the selectors 60 and 62 are selectively connected to the storage units 26, 28, 30 and 32 to effect selection of the storage units in the middle or long distance range as shown in Table 5 below.

TABLE 5

| Selection in Write | Selection in Readout |
| --- | --- |
| Storage Unit 26 | Storage Units 28, 30, 32 |
| Storage Unit 28 | Storage Units 30, 32, 26 |
| Storage Unit 30 | Storage Units 32, 26, 28 |
| Storage Unit 32 | Storage Units 26, 28, 30 |

Figure 11:
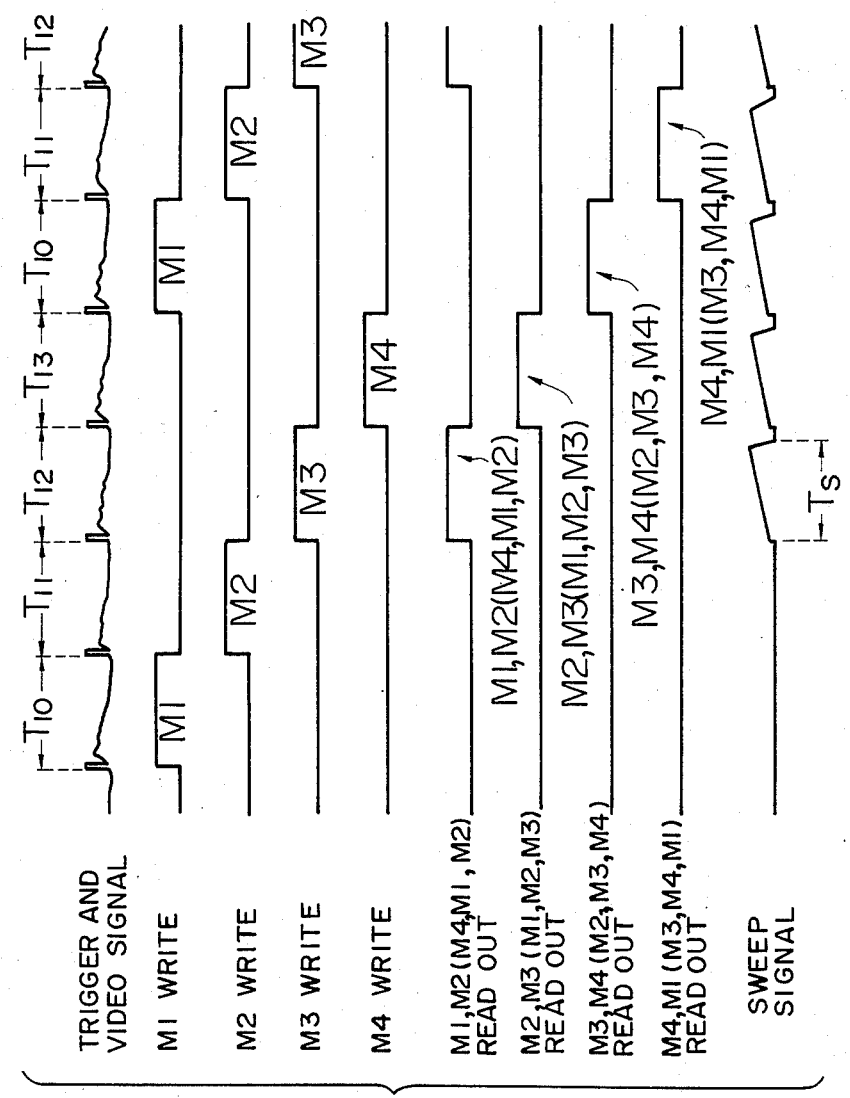
FIG. 11 is a time chart showing control in a middle distance range in the embodiment of FIG. 10.

The function of the third embodiment shown in FIG. 10 will be described hereinafter with reference to the time chart of FIG. 11 showing control in the middle distance range.

When the weather mode switch 80 is turned off, i.e. in the normal mode, digital video signals M1, M2, M3 and M4 obtained on the basis of the triggers generated in time cycles $T_{10}$, $T_{11}$, $T_{12}$ and $T_{13}$ are selectively written in real-time successively in the storage units 26, 28, 30 and 32 by the selector 60. Simultaneously with start of the write of the digital video signal M3 relative to the storage unit 30, the selector 62 allows the storage units 26 and 28 having the digital video signals M1 and M2 written therein in the time cycles $T_{10}$ and $T_{11}$ to be selectively connected to the arithmetic unit 64. The mean value or peak of the digital video signals M1 and M2 parallelly read out of the storage units 26 and 28 is obtained in the arithmetic unit 64 and supplied to the D/A converter 40 to be converted into an analog signal, and the analog signal is inputted to the CRT display 42 to be displayed thereon by sweeping. In the same manner, simultaneously with start of the write of the digital video signal M4 relative to the storage unit 32 in the time cycle $T_{13}$, the storage units 28 and 30 having the digital video signals M2 and M3 written therein in the time cycles $T_{11}$ and $T_{12}$ are connected to the arithmetic unit 64 by the selection of the selector 62 and read out the stored data parallelly therefrom.

When the weather mode switch 80 is turned on, i.e. in the stormy weather mode, the control in readout of the digital video signals from the storage units 26, 28, 30 and 32 is effected as parenthesized in the time chart in FIG. 11. When the digital video signal M3 is written in the storage unit 30 in the time cycle $T_{12}$, for example, the remaining storage units 26, 28 and 32 are simultaneously connected to the arithmetic unit 64 by the selection of the selector 62. The digitial video signals M4, M1 and M2 are parallelly read out into the arithmetic unit 64, and the mean value or peak obtained by computation or selection in the arithmetic unit 64 is converted into an analog signal and then subjected to sweep display by the CRT display 42.

In a rough voyage, there gives rise to sea return of radio waves by a billow due to a strong wind and noise components which will be mixed in video signals are increased. In view of such increase of noise components under stress of weather, the third embodiment shown in FIG. 10 operates the weather mode switch 80 to be turned on to parallelly read out the digital video signals which have been written in the three storage units to obtain the mean value by computation or the peak by selection. With this construction, the effect of suppressing the noise components included in the video signals can be enhanced and it is possible to sweep-display radar images having a high S/N even in a stormy weather which often gives rise to sea return.

Figure 12:
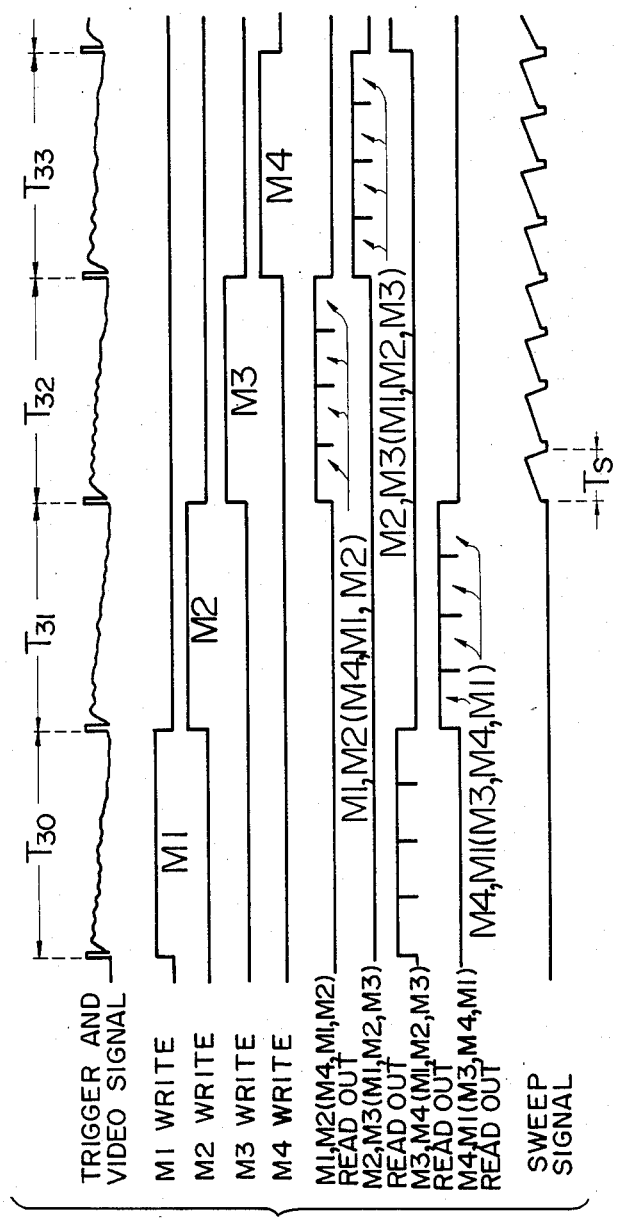
FIG. 12 is a time chart showing control in a long distance range in the embodiment of FIG. 10.

FIG. 12 is a time chart showing control carried out when the long distance range has been set in the third embodiment of FIG. 10. In the long distance range, when the weather mode switch 80 is turned off, i.e. in the normal mode, two storage units which have already written therein the digital video signals before the present writing time cycle are selected from the storage units which are successively writing therein digital video signals and allowed to parallelly read out the stored digital video signals in the same manner as in the middle range described above. On the other hand, when ON operation of the weather mode switch 80 is effected under stress of weather, the parallel readout from the two storage units is switched over to parallel readout from the three storage units, thereby enhancing the effect of removing noise components due to sea return etc. in a stormy weather as in the middle distance range mentioned above. In the long distance range of this embodiment as well as in the long distance range of the first or second embodiment, when two or three storage units are selected for the readout treatment, the parallel readout treatment is repeated four times in synchronism with the sweep time cycle Ts, thereby making it possible to heighten the density of scanning lines in the CRT screen and enhance the display ability.

In the third embodiment described so far, the sweep frequency fs is set constant at 2 KHz irrespective of the lengths of distance ranges. However, the present invention should not be restricted to this embodiment, but may adopt an optional sweep frequency. Further, although the number of the storage units to be used in the third embodiment is set at four, this number is the minimum number for working the present invention and may be increased to five or more. In addition, the repetition number of the readout of the stored data in the long distance range is set at four. However, this repetition number may suitably be increased depending on a prescribed transmission/reception frequency.

Furthermore, the display control accompanied with switchover of distance ranges according to the present invention may be applied not only to a radar apparatus as in the embodiments described so far, but also to a sonar which allows frequently received signals to be treated by display, an ultrasonic flaw detector, or the like without giving any modification thereto.

What is claimed is:

1. A PPI radar apparatus for displaying an image of a target on a CRT screen by PPI sweep of an electron beam, comprising:

an A/D converting means for converting a video signal received by a radar antenna into a digital video signal;

a distance range selecting means having switchover ranges of at least short distance ranges, middle distance ranges, and long distance ranges of generation period of a transmission pulse signal, for selecting a distance range of the target image to be displayed on said CRT screen;

a plurality of storing means each for writing therein and reading out therefrom said digital video signal which is outputted from said A/D converting means, in synchronism with said transmission pulse signal;

a transmission/reception control means for switching over a transmission/reception time cycle Tt of a transmission pulse relative to a constant sweep display time cycle Ts into a transmission/reception time cycle $Tt = Ts/N$ obtained by dividing the sweep display time cycle Ts by an integer N in selection of said short distance ranges, into a transmission/reception time cycle $Tt = Ts$ in selection of said middle distance ranges, or into a transmission/reception time cycle $Tt = M \cdot Ts$ obtained by multiplying the sweep display time cycle Ts with an integer M in selection of said long distance ranges;

a write/readout control means for selecting a predetermined number of storing means from among said plurality of storing means in accordance with a distance range selected from the short, middle, and long distance ranges by said distance range selecting means, allowing said predetermined number of storing means to successively write therein the digital video signals repeatedly obtained every transmission/reception time cycle and in parallel with the successive writing operations, and allowing said predetermined number of storing means to read out, in synchronism with said sweep display time cycle and said transmission pulse signal, the digital video signal which have been written in the storing means at least one time cycle before the present transmission/reception time cycle in which one of said predetermined number of storing means is writing a digital video signal therein; and a displaying means for displaying on said CRT screen an anlog signal into which the digital video signal outputted from one of said predetermined number of storing means by said write/readout control means is converted.

2. A PPI radar apparatus according to claim 1, wherein said write/readout control means comprises:

a short distance range storage control means which selects 2N storing means from said plurality of storing means which 2N is obtained by multiplying by 2 the number N of the reception time cycles Tt of the video signals received in one sweep display time cycle Ts when said short distance ranges are selected by said distance range selecting means, allows the selected 2N storing means to successively write therein digital video signals corresponding to those in 2N time cycles, in parallel with the successive write allows digital video signals corresponding to those in N time cycles written in N storing means in the preceding sweep display time cycle Ts to be read out parallelly, and outputs a mean value or peak of the read-out N digital video signals, a middle distance range storage control means which selects two of said plurality of storing means when said middle distance ranges are selected by said distance range selecting means, allows one of the two selected storing means to write therein digital video signals corresponding to those received in one reception time cycle Tt and, in parallel with the write, allows the other storing means to read out the digital video signals which have been written in the preceding reception time cycle, and a long distance range storage control means which selects two of said plurality of storing means when said long distance ranges are selected by two distance range selecting means, allows one of the two selected storing means to write therein digital video signals corresponding to those received in one reception time cycle Tt and, in parallel with the write, allows the other storing means to read out four times the digital video signals which have been written in the preceding reception time cycle.

3. A PPI radar apparatus according to claim 1, wherein said short distance ranges include $\frac{1}{4}$, $\frac{1}{2}$, $\frac{3}{4}$ and 1.5 nautical miles, said middle distance ranges include 3, 6 and 12 nautical miles, and said long distance ranges include 24, 48 and 120 nautical miles.

4. A PPI radar apparatus according to claim 1, wherein said transmission/reception control means determines, when the sweep display frequency fs is set to satisfy fs=2 KHz, the transmission frequency ft in selection of said short distance ranges to satisfy ft=2 fs=4 KHz and that in selection of said long distance ranges to satisfy ft=fs/4=0.5 KHz.

5. A PPI radar apparatus according to claim 1, wherein said write/readout control means is provided with a means which selects four of said plurality of storing means when said integer N=2 in selection of said short distance ranges, allows the four selected storing means to successively write therein digital video signals corresponding to those in four time cycles repeatedly and, in parallel with the successive write, allows one of the four selected storing means to parallelly read out the digital video signals, which have been written in two of said four selected storing means in the preceding time cycles, in synchronism with the sweep display cycle.

6. A PPI radar apparatus according to claim 1, wherein said write/readout control means is provided with a means which selects three of said plurality of storing means in selection of said middle or long distance ranges, allows the three selected storing means to successively write therein digital video signals corresponding to those in three time cycles repeatedly and, in parallel with the successive write, allows one of the three storing means to parallelly read out of the digital video signals, which have been written in two of said three selected storing means in the preceding time cycles, in synchronism with the constant sweep display cycle.

7. A PPI radar apparatus according to claim 6, wherein said write/readout control means is provided with a means which parallelly reads out four times repeatedly the digital video signal, which have been written in said two storing means in the preceding time cycles, in synchronism with the sweep display time cycle when the integer M=4 in selection of said long distance ranges.

8. A PPI radar apparatus according to claim 6, wherein said write/readout control means is provided with a means which selects four of said plurality of storing means in selection of said short, middle or long distance ranges, allows the four selected storing means to successively write therein repeatedly digital video signals corresponding to those in four time cycles and, in parallel with the successive write, allows one of the storing means to parallelly read out the digital video signals which have been written in either two or three of said selected storing means in the preceding time cycles.

9. A PPI radar apparatus according to claim 8, wherein said write/readout control means is provided with a weather mode switch and a switchover means which effects switchover to parallel readout of the digital video signals which have been written in two of said selected storing means when said weather mode switch is turned off and, when said weather mode switch is turned on, effects switchover to parallel readout of the digital video signals which have been written in three of said selected storing means.

* * * * *